United States Patent Office
3,365,061
Patented Jan. 23, 1968

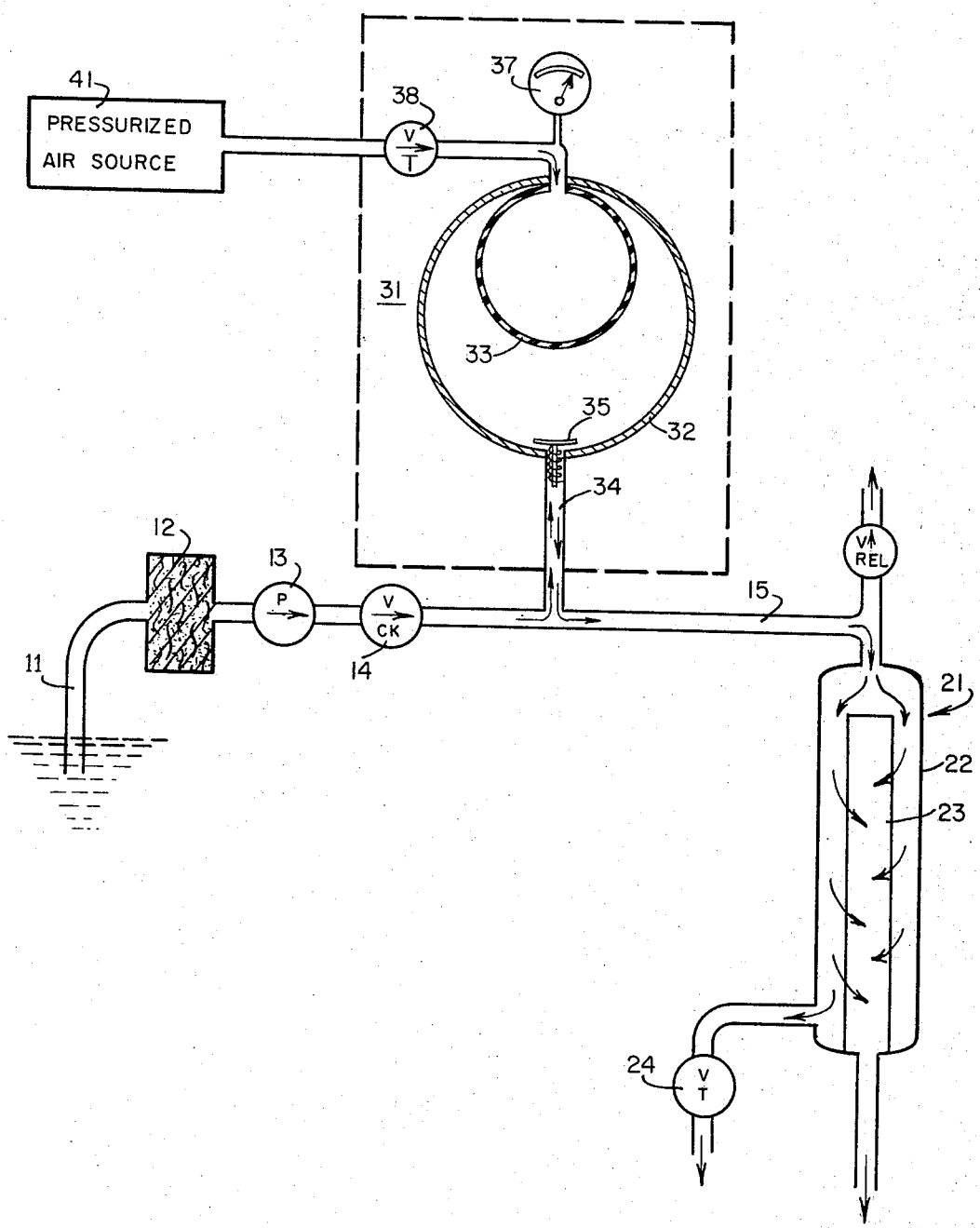

3,365,061
PORTABLE REVERSE OSMOSIS APPARATUS
Donald T. Bray, San Diego, Calif., assignor, by mesne assignments, to Gulf General Atomic Incorporated, San Diego, Calif., a corporation of Delaware
Filed Oct. 4, 1965, Ser. No. 492,400
2 Claims. (Cl. 210—130)

ABSTRACT OF THE DISCLOSURE

Portable apparatus for producing desalinized water. A hand-operated reciprocating piston pump supplies saline water through a check valve into a line connected to a reverse osmosis purification device. A hydraulic accumulator is connected to the line through an initially closed valve which opens when pressure in the line is at a value above the osmotic pressure of the aqueous solution. A relief valve prevents rupture of the semipermeable membranes and a throttle valve in the discharge line facilitates maintenance of the desired operating pressure.

---

This invention relates to fluid purification apparatus, and more particularly, to such apparatus which is specially suited for compact, light weight construction.

Under certain conditions, it may be desirable to have available for use, compact, light weight purification apparatus to provide an immediate supply of potable water. For example, such apparatus might be useful in an emergency at sea for desalinating sea water for drinking purposes. Such apparatus would also be of use in boats or seaside resort cottages or homes to provide what may be an otherwise costly and difficult to obtain supply of potable water.

It has been proposed (see copending application Ser. No. 419,881, filed Dec. 21, 1964, and copending application Ser. No. 441,591, filed Mar. 22, 1965, both assigned to the assignee of the present invention) to utilize the principle of reverse osmosis to purify water for drinking, washing, cooking, etc. Apparatus utilizing this principle appears to have considerable advantage over evaporation processes, distillation processes, and ion removal procedures, all of which have certain undesirable features which limit their use in desalinating sea water.

It is an object of this invention to provide improved apparatus for fluid purification purposes.

Another object of the invention is to provide purification apparatus which is specially suited for compact, light weight construction.

Still another object of the invention is to provide apparatus for desalinating brackish water or sea water, and which is especially suitable for emergency use.

In accordance with the invention, apparatus for removing dissolved impurities from a fluid includes a purifying device which is responsive to fluid supplied thereto at a predetermined pressure to remove the dissolved impurities from the fluid. The purifying device is a reverse osmosis type of purifier, in which case the pressure of supplied fluid should be greater than the osmotic pressure of the fluid. A pumping device, which may be a manually operated device, is provided for supplying the fluid to the purifying device. A hydraulic accumulator is coupled to the purifying device and operates to store energy supplied to the system by the pump and smooth out relatively rapid fluctuations in flow rate and pressure of the fluid supplied to the purifying device. The accumulator may incorporate an initially closed valve which opens after the pressure in the line exceeds the desired operating pressure.

The drawing is a schematic diagram of purifying apparatus constructed in accordance with the invention.

The apparatus shown in the drawing is particularly suited for the desalination of sea water and is especially adapted for compact, light weight construction. The water to be purified is taken into the apparatus through a flexible intake hose 11 and a filter 12 by means of a pump 13. The filter 12 serves to remove any foreign particles which may be suspended in the water being drawn in to the system. A check valve 14 is coupled to the outlet side of pump 13. Fluid conductor or tubing 15 couples the check valve 14 to the intake of the purification device 21.

Purfication device 21 may be of the type shown and described in the two copending applications previously cited, and operates on the reverse osmosis principle. It is well known that the process of osmosis involves the tendency toward equalization of the concentrations of two solutions of unequal concentration separated by a semi-permeable membrane by diffusion of one component of the solutions through the membrane. The ideal membrane would, of course, have a definite permeability for one component of a solution, such as a solvent, while at the same time be totally impermeable to another component of the solution, such as the solute.

When the solution having the higher concentration is subjected to an elevated pressure relative to the pressure existing in the solution having the lower concentration, diffusion through the membrane may be restrained or halted. In the latter case, the equilibrium pressure is known as the osmotic pressure. If the pressure applied to the more concentrated solution is further increased relative to that of the lower concentration solution so that the pressure difference exceeds the osmotic pressure, reverse osmosis occurs. Thus, the more concentrated solution will tend to become even more concentrated as a result of diffusion through the membrane by the solvent in a direction reverse to that in the case of ordinary osmosis.

The pressure at which reverse osmosis takes place is generally dependent upon the composition of the particular solutions disposed on opposite sides of the semipermeable membrane, and such data is readily obtainable in various published handbooks. If ordinary sea water is disposed on one side of a suitable semi-permeable membrane, while a solution of relatively pure water is present on the other side of the membrane, reverse osmosis occurs when a hydraulic pressure of approximately 350 pounds per square inch, absolute, is applied to the sea water. By providing a membrane structure having a large total surface area and by providing an appropriate means for collecting purified water, relatively large quantities of sea water or other such solutions may be purified in a relatively short time. Proper membrane construction may also serve to filter out harmful bacteria.

The purification device 21, shown schematically, includes an enclosing tank 22 and a semi-permeable membrane 23. Sea water entering tank 22 at a pressure greater than the osmotic pressure diffuses through membrane 23 and is desalinated in the process. A throttle or needle valve 24 is provided for drawing off the more concentrated sea water and for maintaining system pressure, and a tube 25 is provided for drawing off the purified sea water. The rate of purified water production would depend upon the pressure differential existing across the member 23 and upon the membrane area.

For practical rates of fresh water production, it is necessary that the pressure differential existing on either side of the membrane 23 in device 21 be substantially higher than the osmotic pressure. For example, a unit of desirable compactness which would produce approximately 5 gallons per hour at its maximum operating rate, might require an operating pressure of the order of 1,500 p.s.i. Without a constant flow rate or rate of replenishment of the sea water in the purification device 21, the pressure of the unpurified sea water varies sharply with each piston stroke and can cause damage to the system as well as requiring a continuous pump action.

In order to maintain a relatively constant flow rate due to a relatively constant pressure of the fluid supplied to purification device 21, a hydraulic accumulator 31 is coupled to the purification device 21 through line 15. The accumulator 31 operates to effectively store the energy applied to the system by the pump 13 so that the desired operating pressure and fluid flow may be maintained relatively constant, that is, not subject to rapid fluctuations due to, for example, the pump piston strokes. The accumulator 31 may be of a type known in the art and includes a spherical or cylindrical tank 32. An air-retaining diaphragm 33 is disposed inside of tank 32 and may be pressurized with air to a pressure substantially higher than the osmotic pressure, for example, 500 p.s.i. The tank 32 is coupled to the tubing 15 through tubing 34 which provides an inlet for sea water to the tank 32. Valve 35 is so built that it will allow water to pass into tank 32 when the pressure in line 15 exceeds the tank pressure. Valve 35 is set to remain open under light spring pressure so that there is a free passage of water into and out of tank 32 whenever the water pressure exceeds the initial pressure of the air loading in the diaphragm 33. Thus with an initial diaphragm air pressure of 500 p.s.i., valve 35 would remain closed until such pressure was exceeded in the line 34.

A pressure release valve 36 connected into line 15 is set to open and relieve the pressure in the system when such pressure exceeds the maximum operating pressure of the purification device 21 by a predetermined amount.

Accumulator 31 further includes a means for initial pressurization of the diaphragm and includes an air pressure gauge 37 and throttle valve 38. Air source 41, which is a means for maintaining a desired pressure in the diaphragm 33, might, for example, be a hand operated or power driven air pump which incorporates a check valve or might be a tank of compressed air.

In operation of the apparatus, sea water is drawn through intake hose 11 and filter 12 by pump 13 and is forced through check valve 14, in and through tubing 15, into the purification device 21. Pressure in the purification device 21 and line 15 will build up until the minimum operating pressure (i.e., the air pressure in diaphragm 33) is exceeded. Valve 35 will then open and allow the pressure in tank 32 to build up along with the pressure in device 21 and line 15. The full range of operative pressures for the device 21 will be determined by the initial air pressure loading in the diaphragm 33 and the amount of compression to be tolerated on the diaphragm volume which is set as desired by the pressure relief valve. The actual operating pressure within this range will, of course, depend upon the energy added to the system by pump 13. Although the operating pressure may vary within this range, it will do so smoothly due to the operation of accumulator 31, which acts as a sort of integrator.

The air diaphragm 33 not only serves as a surge cushion to maintain a relatively constant pressure and flow rate in the device 21, but also provides an advantage in the event that pump 13 is hand operated in that the pumper can discontinue work for a few seconds without losing product water flow due to the maintenance of the pressure by air diaphragm 33. At a maximum operating pressure of 1,000 p.s.i., the air diaphragm 33 would be compressed to one-half of the volume of tank 32 if it were initially pressurized to 500 p.s.i. (without water in the tank). Tank 32 may be small and, for portable apparatus, is preferably of one liter capacity or even less. A one liter capacity spherical tank could be about five inches in diameter with a 0.080 inch wall thickness and a weight of less than three pounds when empty.

When the pump 13 ceases to operate and the needle valve 24 is not shut off, either intentionally or accidentally, the pressure in the accumulator will fall by loss of water through the membrane unit 21 until it reaches the regulating level of the initial loading in diaphragm 33 (500 p.s.i.). Since initial air diaphragm pressure is sufficient to cause the diaphragm 33 to fill tank 32, all the water will be expelled from the tank. At this point valve 35 closes due to the force exerted on it by the diaphragm 33 and prevents rupture of the diaphragm 33 by extension into line 34.

The device described herein is an immediate response type unit with no storage capacity. Product water is produced only in response to operation of the pump 13, and only at a rate proportional to the input energy. For example, at a maximum rate of 5 gallons per hour at an operating pressure of 1,000 p.s.i., the pumping power requirement is approximately 0.1 horsepower. By exerting a corresponding effort on a hand pump, a man could produce 3 quarts (daily minimum requirement) in 10 minutes. If the power input were half, it would take 20 minutes to produce the daily minimum requirement.

All of the equipment which might be utilized in the apparatus shown in the drawing is commercially available, except for the purification device 21. This device, as before mentioned, is shown and described in the previously cited patent applications. For a five gallon per hour maximum production rate, such a device could be a cylinder about 3 inches in diameter and about 14 inches high, and would weigh between eight and nine pounds when filled with water. A hand pump which could be used as pump 13 might weigh approximately five pounds. It would be possible to use a small gasoline engine driven pump rather than a hand operated pump for pump 13 and thus increase the capacity of the system. Such a larger unit might be mounted in a vehicle and could supply, for example, an army battalion or a small community with drinking water requirements. A hand operated pump 13 would, of course, have a lower capacity but would be possible to incorporate in an extremely lightweight assembly, for example, 30 pounds. Such apparatus could be mounted on an aluminum frame and easily carried by a man, or placed in a boat. It may therefore be seen that the invention provides improved purification apparatus which is specially suited for compact, lightweight construction and which may be utilized for desalinating sea water for emergency or low demand use.

Various features of the present invention are set forth in the following claims.

What is claimed is:

1. Portable apparatus for removing dissolved impurities from water including in combination, a reverse osmosis purification device, a hand-operated reciprocating piston pump for supplying the water, a check valve connected to the outlet of said pump, a line connecting said check valve to said purification device for conducting the water therebetween, a hydraulic accumulator having an expansible diaphragm therein initially expanded to a pressure in excess of the osmotic pressure of the aqueous solution to close a valve means connecting said accumulator to said line which valve means opens in response to pressure in said line exceeding the pressure in said expanded diaphragm to pass water into said accumulator and maintain a relatively constant pressure in said line, a normally closed valve coupled to said line between said pump and said reverse osmosis unit which opens in response to the pressure in said line exceeding a predetermined level to relieve such pressure, and a throttle valve disposed in a discharge line leading from said reverse osmosis purification device through which the nonpermeated water exits.

2. Portable apparatus in accordance with claim 1, wherein said reverse osmosis purification device has a capacity for providing about five gallons of desalinated water per hour at an operating pressure of about 1,000 p.s.i., wherein said hydraulic accumulator includes a spherical tank having an expansible diaphragm therein inflated to a pressure of about 500 p.s.i., and wherein said normally closed valve means is responsive to pressure of about 1200 p.s.i. to open and relieve the pressure.

References Cited

UNITED STATES PATENTS

| | | | |
|---|---|---|---|
| 32,815 | 7/1861 | Arnold | 210—416 |
| 1,297,603 | 3/1919 | Smith | 210—416 X |
| 2,544,289 | 3/1951 | Andrews | 210—349 |
| 2,649,205 | 8/1953 | Quinn | 210—416 |
| 2,876,793 | 3/1959 | Vanderpoel et al. | 137—505.42 |
| 3,039,485 | 6/1962 | Brohl | 137—483 |
| 3,133,132 | 5/1964 | Loeb et al. | 264—39 |
| 3,156,645 | 11/1964 | Chapin et al. | 210—321 X |

FOREIGN PATENTS 846,307   8/1960   Great Britain.

OTHER REFERENCES

Popular Science, May 1950, pp. 151 and 152.

"Vapor Gap Reverse Osmosis," from 1964 Saline Water Conversion Report; placed on sale July 14, 1965; pp. 176 and 178–181 relied on; for sale by Superintendent of Documents, U.S. Government Printing Office, Washington, D.C.

REUBEN FRIEDMAN, *Primary Examiner.*

F. SPEAR, *Assistant Examiner.*